(12) United States Patent
Ito

(10) Patent No.: US 10,972,694 B2
(45) Date of Patent: Apr. 6, 2021

(54) IMAGING APPARATUS, IMAGING SYSTEM, AND CONTROL METHOD OF IMAGING APPARATUS

(71) Applicant: CANON KABUSHIKI KAISHA, Tokyo (JP)

(72) Inventor: Maasa Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/431,439

(22) Filed: Jun. 4, 2019

(65) Prior Publication Data

US 2019/0387190 A1    Dec. 19, 2019

(30) Foreign Application Priority Data

Jun. 15, 2018  (JP) ................................. 2018-114263

(51) Int. Cl.
| | |
|---|---|
| *H04N 5/378* | (2011.01) |
| *H04N 5/341* | (2011.01) |
| *H04N 5/06* | (2006.01) |
| *H04N 5/369* | (2011.01) |
| *H04N 5/357* | (2011.01) |
| *H04N 9/73* | (2006.01) |
| *H04N 9/04* | (2006.01) |

(52) U.S. Cl.
CPC ............. *H04N 5/378* (2013.01); *H04N 5/06* (2013.01); *H04N 5/341* (2013.01); *H04N 5/36963* (2018.08); *H04N 5/3572* (2013.01); *H04N 9/04515* (2018.08); *H04N 9/735* (2013.01)

(58) Field of Classification Search
CPC .......... H04N 5/378; H04N 5/341; H04N 5/06; H04N 5/36963; H04N 5/3572; H04N 9/735; H04N 9/04515; H04N 5/23227
See application file for complete search history.

(56) References Cited

U.S. PATENT DOCUMENTS

| | | | |
|---|---|---|---|
| 10,356,286 B2 | 7/2019 | Ito | |
| 2006/0132608 A1* | 6/2006 | BenDaniel | G06T 5/00 348/207.1 |
| 2007/0269182 A1 | 11/2007 | Sato | |

(Continued)

FOREIGN PATENT DOCUMENTS

| | | |
|---|---|---|
| JP | 2007-312007 | 11/2007 |
| JP | 2012-175495 | 9/2012 |

(Continued)

OTHER PUBLICATIONS

U.S. Appl. No. 16/425,128, filed May 29, 2019, by Maasa Ito.

*Primary Examiner* — Shahbaz Nazrul
(74) *Attorney, Agent, or Firm* — Venable LLP

(57) ABSTRACT

An imaging apparatus includes a pixel unit having a plurality of pixels, a signal processing unit that generates image data by performing signal processing on a pixel signal read from the pixel unit and outputs the image data on a frame basis, an information generation unit that generates time information on a frame basis, and an output unit that outputs the time information associated with one frame before the image data of the one frame is output from the signal processing unit and outputs the image data of the one frame after an end of the output of the time information ends.

20 Claims, 15 Drawing Sheets

(56) References Cited

U.S. PATENT DOCUMENTS

| | | | | |
|---|---|---|---|---|
| 2010/0053380 A1* | 3/2010 | Ise | ........................ | H04N 5/3658 |
| | | | | 348/241 |
| 2011/0261227 A1* | 10/2011 | Higaki | ............. | H04N 5/232411 |
| | | | | 348/231.5 |
| 2012/0200717 A1* | 8/2012 | Suzuki | ............... | H04N 1/32106 |
| | | | | 348/207.1 |
| 2013/0286207 A1 | 10/2013 | Oba | | |
| 2018/0103182 A1* | 4/2018 | Ito | .......................... | H04N 5/345 |

FOREIGN PATENT DOCUMENTS

| JP | 2013-229699 | 11/2013 |
|---|---|---|
| JP | 2017-5299 | 1/2017 |

\* cited by examiner

FIG. 9

| HEADER B0 | 1 FITS BLOCK 2880 BYTES × N (INTEGER) | HEADER 1 (80 BYTES/ASCII/KEYWORD RECORD)<br>HEADER 2 (80 BYTES/ASCII/KEYWORD RECORD)<br>HEADER 3 (80 BYTES/ASCII/KEYWORD RECORD)<br>HEADER 4 (80 BYTES/ASCII/KEYWORD RECORD)<br>...<br>HEADER 36 (80 BYTES/ASCII/KEYWORD RECORD) |
|---|---|---|
| DATA B1 | 1 FITS BLOCK 2880 BYTES × N (INTEGER) | DATA (BINARY OR ASCII) |

FIG. 10

```
SIMPLE    =                    T / file does conform to FITS standard
BITPIX    =                    16 / number of bits per data pixel
NAXIS     =                    2 / number of data axes
NAXIS1    =                    2160 / length of data axis 1
NAXIS2    =                    1200 / length of data axis 2
EXTEND    =                    T / FITS dataset may contain extensions
COMMENT       FITS(Flexible image Transport System) format is defined in 'Astronomy
COMMENT       and Astrophysics', volume 376, page 359; bibcode: 2001A&A...376...359H
BZERO     =                    32768  / DATA ZERO
BSCALE    =                    1 / DATA SCALE
EXPTIME   =                    0.01 / duration of exposure in seconds
S-OPEN    =  '2017-09-05T07:32:35.98575' / GPS shutter open time (UTC)
S-CLOSE   =  '2017-09-05T07:32:35.99575' / GPS shutter close (UTC)
GPS-STAT  =                    'LOCKED' /    GPS status during exposure
DATE      =  '2017-09-05T07:32:35' / file creation date (YYYY-MM-DDThh:mm:ss UT)
FRAME-NO  =                    '1' / current number of shots
CAM-GAIN  =                    'x1' / CMOS gain
LENS-F    =                    '4' / F-stop(current)
END
```

IMAGING APPARATUS, IMAGING SYSTEM, AND CONTROL METHOD OF IMAGING APPARATUS

BACKGROUND OF THE INVENTION

Field of the Invention

The present invention relates to an imaging apparatus, an imaging system, and a control method of the imaging apparatus.

Description of the Related Art

In the field of electronic cameras, as disclosed in Japanese Patent Application Laid-Open No. 2013-229699, a technology that adds imaging information such as lens aperture information, amplifier gain information, or the like to image data is known. In Japanese Patent Application Laid-Open No. 2013-229699, a header is added outside the effective pixel region in a blanking period or the like, and image data of each frame is output.

SUMMARY OF THE INVENTION

An imaging apparatus according to one disclosure of the present specification includes a pixel unit having a plurality of pixels; a signal processing unit that generates image data by performing signal processing on a pixel signal read from the pixel unit and outputs the image data on a frame basis; an information generation unit that generates time information on a frame basis; and an output unit that outputs the time information associated with one frame before output of the image data of the one frame from the signal processing unit is started and starts output of the image data of the one frame after an end of the output of the time information ends.

A control method of the imaging apparatus according to another disclosure of the present specification is a control method of the imaging apparatus including a pixel unit having a plurality of pixels and a signal processing unit that generates image data by performing signal processing on a pixel signal read from the pixel unit and outputs the image data on a frame basis and includes steps of generating time information on a frame basis; outputting the time information associated with one frame before output of the image data of the one frame from the signal processing unit is started; and starting output of the image data of the one frame after an end of the output of the time information ends.

Further features of the present invention will become apparent from the following description of exemplary embodiments with reference to the attached drawings.

BRIEF DESCRIPTION OF THE DRAWINGS

FIG. 9 is a diagram illustrating a FITS format according to the first embodiment of the present invention.

FIG. 10 is a diagram illustrating a FITS format according to the first embodiment of the present invention.

DESCRIPTION OF THE EMBODIMENTS

In Japanese Patent Application Laid-Open No. 2013-229699, when a process of adding time information to image data is delayed at the time of capturing a moving image, a problem such as frame loss may occur. In the technology described below, output forms of time information and image data are considered.

Each embodiment will be described in detail below by using the drawings.

First Embodiment

Figure 1:
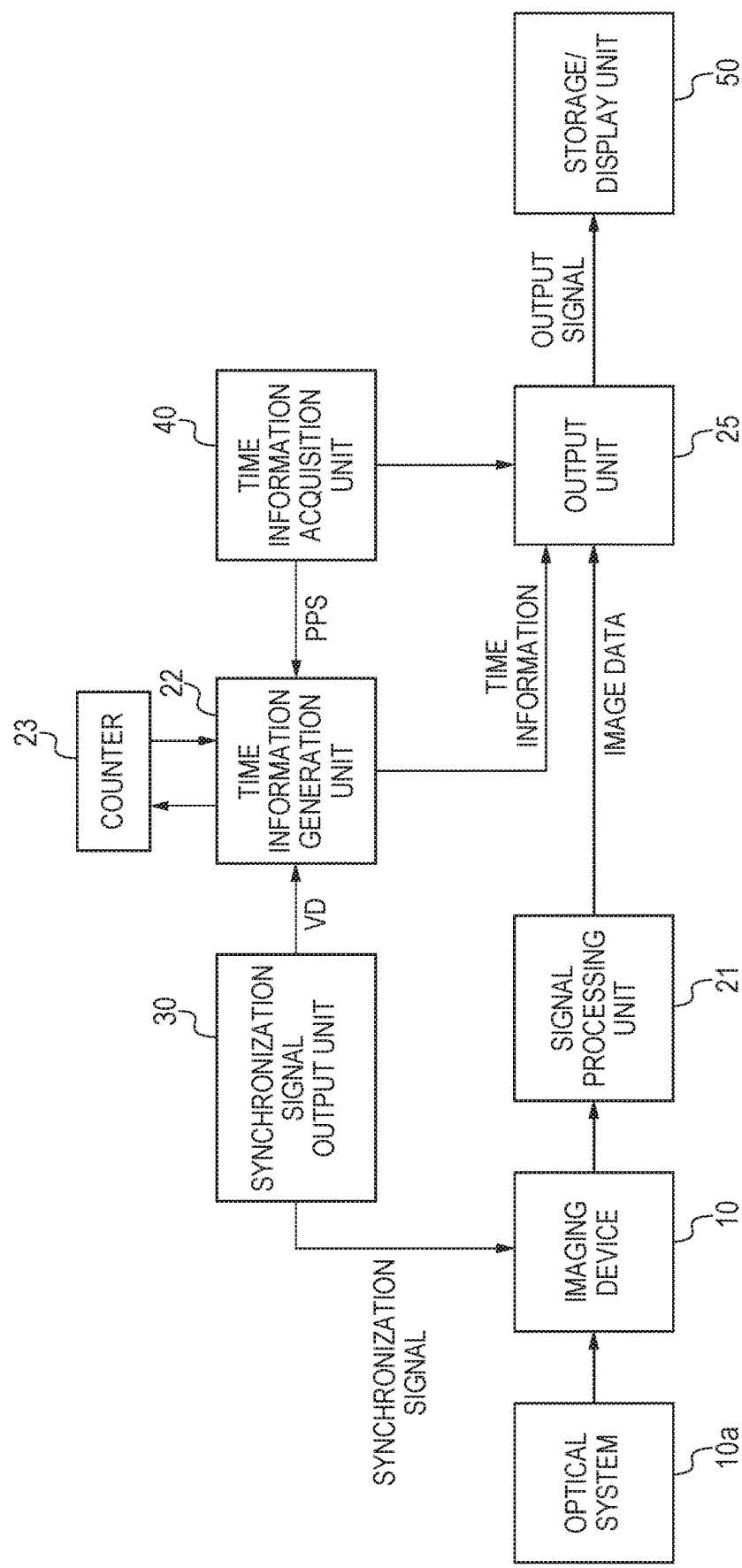
FIG. 1 is a block diagram of an imaging system according to a first embodiment of the present invention.

FIG. 1 is a block diagram of an imaging system according to a first embodiment of the present invention. As illustrated in FIG. 1, the imaging system has an optical system 10a, an imaging device 10, a signal processing unit 21, a time information generation unit 22, a counter 23, an output unit 25, a synchronization signal output unit 30, a time information acquisition unit 40, and a storage/display unit 50.

The imaging device 10 in the present embodiment is a COMS area sensor has a plurality of pixels two-dimensionally arranged and converts an optical signal received via the optical system 10a such as a lens into a pixel signal that is an electrical signal.

The signal processing unit 21 is formed of an Analog Front End (AFE), a Digital Signal Processor (DSP), a frame memory, or the like and performs signal processing on a pixel signal output from the imaging device 10. The AFE includes a differential amplifier, a clamp circuit, and an analog-to-digital conversion circuit and converts an analog pixel signal into digital pixel data by analog-to-digital conversion processing. A DSP is formed of a gate allay circuit or the like and performs a process using optical black pixels, gradation correction such as a gamma process, white balance correction, a demosaicing process, a noise reduction process, or the like. The frame memory is a frame memory that temporarily holds pixel data.

The synchronization signal output unit 30 includes a clock circuit, a counter circuit, or the like and generates a vertical synchronization signal VD, a horizontal synchronization signal HD of the imaging device 10, and a control signal of the imaging device 10. The synchronization signal output unit 30 is not required to be provided inside the imaging system, and the vertical synchronization signal VD and the horizontal synchronization signal HD may be supplied from the outside of the imaging system.

The time information acquisition unit 40 has an antenna that receives radio waves from a plurality of Global Positioning System (GPS) satellites, a receiver circuit that processes a baseband signal, and a demodulation circuit that demodulates information included in the received signal. Based on a time difference of received ratio waves from a plurality of GPS satellites, it is possible to acquire accurate information on latitude, longitude, and altitude of the imaging system. Further, the radio wave received from a GPS satellite includes GPS time information (GPS week information, GPS second information) as reference time and leap-second information. GPS week information is information that circulates from 0 to 1023 starting from Jan. 6, 1980. GPS second information is second elapse information in the GPS week and may be a value within 604800 seconds=7 days×24 hours×60 minutes×60 seconds. Leap-second information represents a difference between GPS time and Universal Time Coordinated (UTC) and is used when GPS time is converted into UTC. Further, the time information acquisition unit 40 outputs an accurate one-second-one-pulse signal referred to as a Pulse Per Second (PPS) signal when demodulating a received radio wave.

The time information generation unit 22 generates time information having time resolution higher than GPS time information by using a PPS signal output from the time information acquisition unit 40 and the vertical synchronization signal VD output from the synchronization signal output unit 30. The time information generation unit 22 counts time by using the counter 23 that counts up in 10 MHz, that is, $10^{-7}$ seconds and resets the counter 23 at a rising edge of the PPS signal, for example. Note that the counter 23 may be reset by using the horizontal synchronization signal HD in addition to the PPS signal and the vertical synchronization signal VD. By using the PPS signal, the horizontal synchronization signal HD, and the vertical synchronization signal VD to reset the counter 23, it is possible to generate accurate time information in which errors are not accumulated.

The output unit 25 adds time information generated by the time information generation unit 22 to image data. Further, the output unit 25 can add position information and image capturing information to image data in addition to time information. The storage/display unit 50 can output image data on a frame basis and may include a storage medium such as a digital interface, a memory card, or the like, or a display device such as a display. Further, the storage/display unit 50 may be connected to a local communication line, a public communication line, the internet, or the like.

Figure 2:
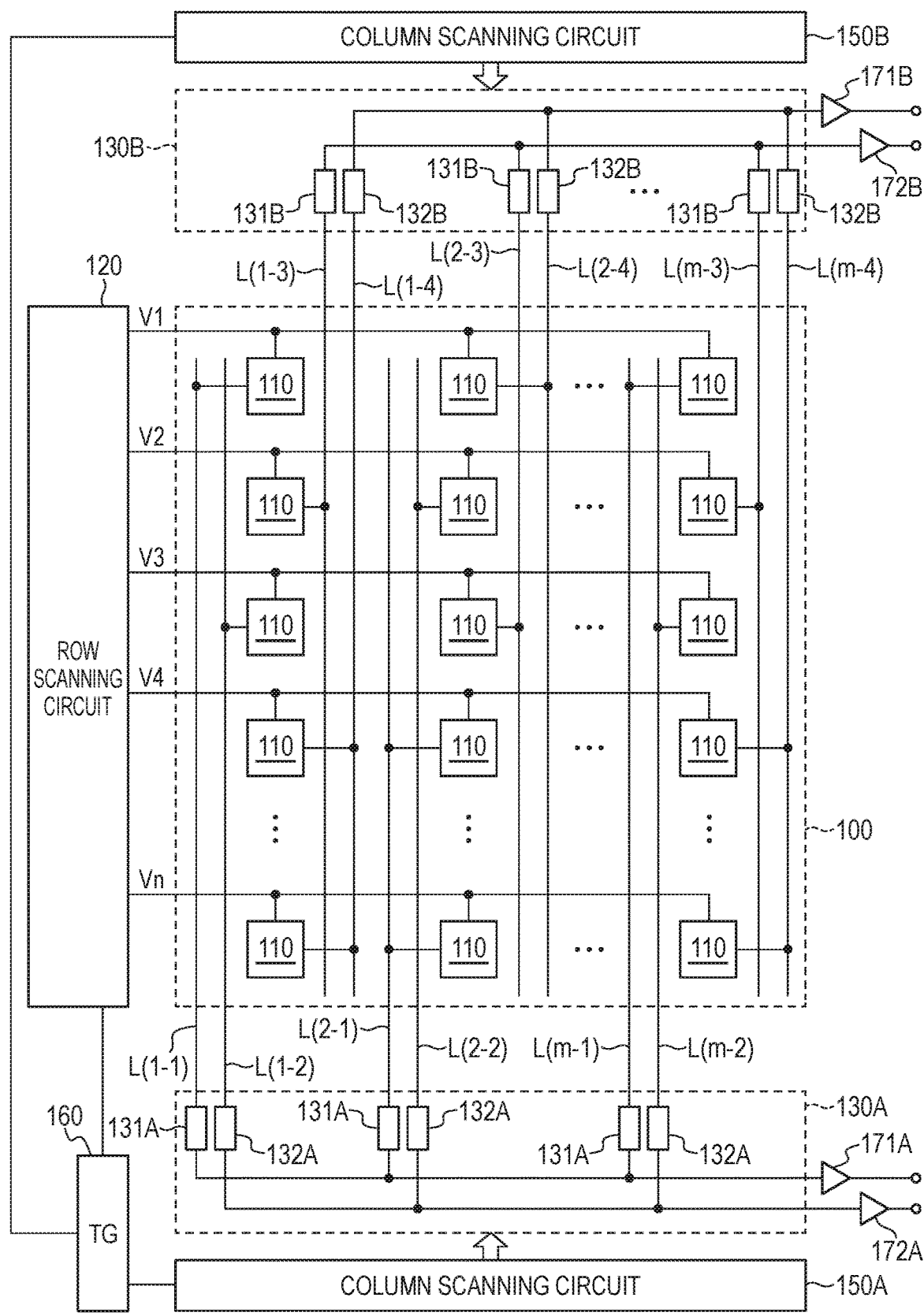
FIG. 2 is a block diagram of an imaging device according to the first embodiment of the present invention.

FIG. 2 is a block diagram of the imaging device 10. The imaging device 10 has a pixel unit 100, a row scanning circuit (row scanning unit) 120, column readout circuits (readout units) 130A and 130B, column scanning circuits 150A and 150B, a control unit 160, and output circuits 171A, 172A, 171B, and 172B. In the pixel unit 100, a plurality of pixels 110 are arranged in two-dimensional matrix in the row direction and the column direction. While the pixel unit 100 in FIG. 2 includes n rows and m columns of the pixels 110, a limited number of pixels 110 are illustrated for simplified illustration. Note that, in the present specification, the row direction indicates the horizontal direction in the drawings, and the column direction indicates the vertical direction in the drawings. In the pixel unit 100, a ranging row in which a focus detection pixel that outputs a signal used for focus detection is arranged and a plurality of imaging rows in which imaging pixels that output signals used for generating an image are arranged are provided. Further, some of the pixels 110 of the pixel unit 100 are light-shielded as optical black pixels (OB pixels).

The pixel 110 includes a color filter, a micro lens, a photoelectric conversion unit, a floating diffusion unit, a reset transistor, a transfer transistor, an amplification transistor, a select transistor, or the like. For example, the color filter may be a primary-color filter of red, blue, or green, and is provided on each pixel 110 in accordance with the Bayer arrangement.

The row scanning circuit 120 receives a control signal from the control unit 160 and performs a reading scan of the pixel unit 100 on a row basis. That is, control signals V1 to Vn are supplied from the row scanning circuit 120 to a pixel row on which a plurality of pixels 110 are arranged, and photoelectric-converted signals are read from the pixels 110. Each of the control signals V1 to Vn includes a control signal that causes the reset transistor, the transfer transistor, or the select transistor included in the pixel 110 to be turned on or off. A plurality of pixels 110 in the column direction are connected to 4×m column signal lines L(1-1) to L(1-4), . . . , L(m-1) to L(m-4), respectively. For example, a plurality of pixels 110 on a first column are connected to column signal lines L(1-1), L(1-2), L(1-3), and L(1-4), and a plurality of pixels 110 on a second column are connected to column signal lines L(2-1), L(2-2), L(2-3), and L(2-4). The column signal lines L(1-1), L(1-2), . . . , L(m-1), L(m-2) are connected to column circuits 131A and 132A of the column readout circuit 130A, respectively.

The column circuit 131A and the column circuit 132A are scanned by the column scanning circuit 150A and sequentially output pixel signals to the output circuits 171A and 172A. Similarly, the column signal lines L(1-3), L(1-4), . . . , L(m-3), L(m-4) are connected to column circuits 131B and 132B of the column readout circuit 130B, respectively. The column circuit 131B and the column circuit 132B are scanned by the column scanning circuit 150B and sequentially output pixel signals to the output circuits 171B and 172B. The pixel signals from the output circuits 171A, 172A, 171B, and 172B are output to the signal processing unit 21 in FIG. 1.

In the present embodiment, since four column circuits 131A, 132A, 131B, and 132B are provided to pixels 110 on each column, it is possible to read the pixel signals from up to four rows of pixels 110 simultaneously. Note that the number of pixel rows that can be read simultaneously is not limited to four and may be one, two, or more than four. Further, pixel signals of a plurality of rows may be added and read.

The column circuits 131A, 132A, 131B, and 132B have a constant current source 115 that serves as a load of an amplification transistor, a differential amplification circuit that amplifies a pixel signal, a holding circuit that temporarily holds a pixel signal, or the like. The control unit 160 outputs the vertical synchronization signal VD, the horizontal synchronization signal HD, and a control signal based on a reference clock (not illustrated) to the row scanning circuit 120 and the column scanning circuits 150A and 150B.

The imaging device 10 of the present embodiment can simultaneously output pixel signals of 16 channels (16 ch) of 4 rows×4 columns by a progressive scan. When the number of scanning rows (number of scans) in 1 frame is 300, for example, the total number of pixel rows is 1200 pixel rows=4 pixel rows×300. When the number of column scans in 1 horizontal scan is 540, the total number of pixel columns is 2160 pixel columns=4 pixel columns×540. Further, it is assumed that the imaging device 10 is capable of rolling shutter operation and image data after digital conversion processing is output in 16 bits. Note that the number of pixels and the number of bits of image data are not limited to the examples described above.

Figure 3:
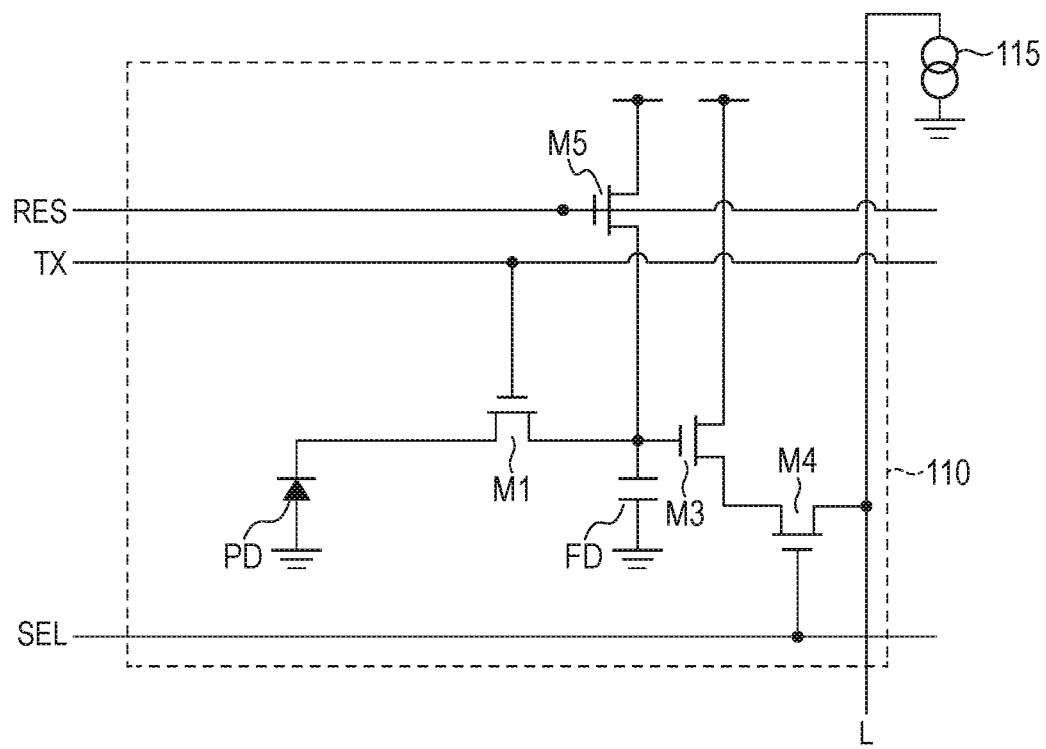
FIG. 3 is an equivalent circuit diagram of a pixel according to the first embodiment of the present invention.

FIG. 3 illustrates an equivalent circuit of the pixel 110 in the imaging device 10 according to the present embodiment. The pixel 110 has a photoelectric conversion unit PD, a floating diffusion portion FD, a transfer transistor M1, an amplification transistor M3, a select transistor M4, and a reset transistor M5.

The photoelectric conversion unit PD photoelectrically converts an incident light that has passed through the color filter and the micro lens and accumulates charges generated by the photoelectric conversion. When turned on, the transfer transistor M1 transfers charges in the photoelectric conversion unit PD to the floating diffusion portion FD of the amplification transistor M3. The drain of the amplification transistor M3 is connected to a power supply voltage line, and the source outputs a signal based on the voltage of the floating diffusion portion FD to the column signal line L via the select transistor M4. The constant current source 115 is connected to the column signal line L. When turned on, the reset transistor M5 resets the voltage of the floating diffusion portion FD.

A common control signal is supplied from the row scanning circuit 120 to the pixels 110 on a single row. That is, on a single row, control signals TX, SEL, and RES are supplied to the transport transistor M1, the select transistor M4, and the reset transistor M5, respectively. Each of these transistors is in an on-state when the control signal is at a high level and in an off-state when the control signal is at a low level. Note that a plurality of pixels 110 may share a single amplification transistor M3.

Figure 4:
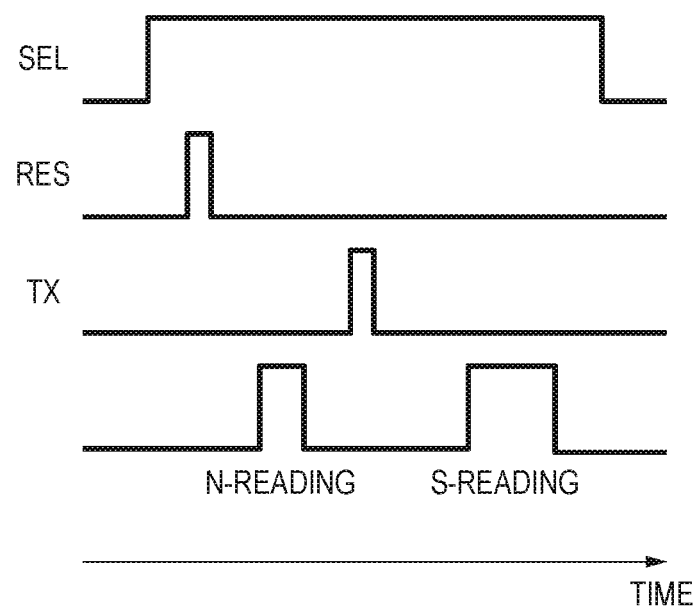
FIG. 4 is a timing chart of control signals according to the first embodiment of the present invention.

FIG. 4 is a timing chart of control signals according to the present embodiment and illustrates an operation of reading a pixel signal. FIG. 4 illustrates the control signal SEL supplied to the select transistor M4, the control signal RES supplied to the reset transistor M5, and the control signal TX supplied to the transfer transistor M1. Each of the transistors M1, M4, and M5 is in an on-state when the corresponding control signal is at a high level and in an off-state when the corresponding control signal is at a low level.

The operation of reading the pixel signal will be described below with reference to FIG. 2 and FIG. 3. First, the row scanning circuit 120 controls the control signal SEL to the high level to turn on the select transistor M4 and select the pixel 110 in which the signal is read. Next, the row scanning circuit 120 controls the control signal RES to the high level and turns on the reset transistor M5. In response to transition of the reset transistor M5 to an on-state, the voltage of the floating diffusion portion FD is reset to the power supply voltage. After the reset transistor M5 is turned off, the column readout circuits 130A and 130B perform readout (N-reading) of the pixel signal obtained at reset from the column signal line L. The row scanning circuit 120 controls the control signal TX to the high level to turn on the transfer transistor M1 and transfer charges in the photoelectric conversion unit PD to the floating diffusion portion FD. The column readout circuits 130A and 130B perform readout (S-reading) of the pixel signal obtained at photoelectric conversion from the column signal line L. The pixel signals read in such a way are processed by a correlated double sampling process in the column readout circuits 130A and 130B and output from the output circuits 171A, 172A, 171B, and 171B. Note that the correlated double sampling process may be performed after analog-to-digital (AD) conversion of the pixel signals.

Figure 5:
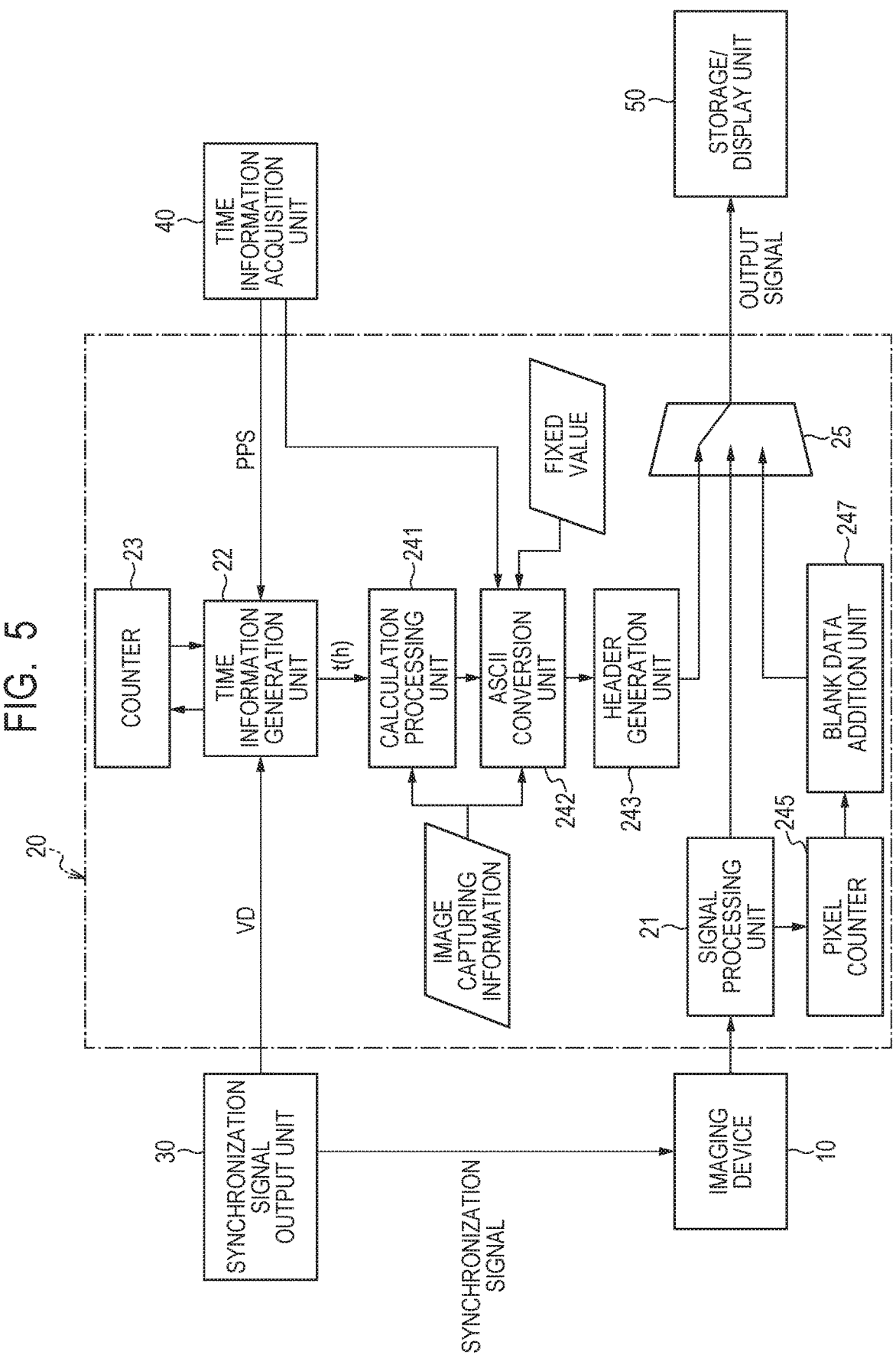
FIG. 5 is a detailed block diagram of the imaging system according to the first embodiment of the present invention.

FIG. 5 is a detailed block diagram of the imaging system according to the present embodiment. In FIG. 5, a main portion of the imaging system illustrated in FIG. 1 is formed of a Field Programmable Gate Array (FPGA) 20. The configuration of the FPGA 20 will be mainly described below. The FPGA 20 includes the signal processing unit 21, the time information generation unit 22, the counter 23, the output unit 25, a calculation processing unit 241, an ASCII conversion unit 242, a header generation unit 243, a pixel counter 245, and a blank data addition unit 247.

The signal processing unit 21 is formed of a Digital Signal Processor (DSP), a frame memory, or the like. The signal processing unit 21 performs an analog-to-digital conversion process, a process using optical black pixels, gradation correction such as a gamma process, white balance correction, a demosaicing process, a noise reduction process, or the like on the pixel signal output from the imaging device 10. The frame memory is a frame memory that temporarily holds pixel data.

As described in FIG. 1, the time information generation unit 22 resets the counter 23 by using a PPS signal or a vertical synchronization signal VD and generates time information t(h) having a higher time resolution than GPS time information.

The calculation processing unit 241 calculates the exposure start time, the exposure end time, and the exposure time of a frame by using the time information t(h). The ASCII conversion unit 242 converts information such as GPS information, image capturing information, a fixed value, or the like in addition to the exposure start time, the exposure end time, and the exposure time into data of American Standard Code for Information Interchange (ASCII) form based on a Flexible Image Transport System (FITS) format. The FITS format is a general-purpose format used in the space astronomy field or the like, for example. GPS information includes position information (latitude information and longitude information), leap-second information used when GPS time is converted to Universal Time Coordinated (UTC), GPS time information (GPS week information and GPS second information), or the like. Further, GPS information may include time information in microseconds based on a PPS signal.

Image capturing information indicating an image capturing condition or the like includes information on the imaging system, information on the imaging device 10, and information on the optical system 10a and may be used for processing of image data. Information on the imaging system includes a name, a serial number, or the like of the imaging system, and information on the imaging device 10 may include the exposure time, a frame number, a gain setting value, a temperature, a serial number, or the like. Information on the optical system 10a includes a type of the lens, an F-number, a zooming position, or the like. The fixed value may include information such as a comment, a keyword, or the like in a FITS format described below. The header generation unit 243 rearranges ASCII format data converted by the ASCII conversion unit 242 in accordance with a FITS format and generates a FITS header. The generated FITS header is input to the output unit 25.

The pixel counter 245 counts image data sequentially output from the signal processing unit 21 on a pixel basis. When the number of pixels counted by the pixel counter 245 is less than the predetermined number of FITS blocks, the blank data addition unit 247 outputs blank data. A FITS header from the header generation unit 243, image data from the signal processing unit 21, and blank data from the blank data addition unit 247 are input to the output unit 25. The output unit 25 switches a FITS header, image data, and blank data at a timing in accordance with the FITS format. When the output unit 25 detects a keyword ("END") representing the end of the FITS header in the FITS header, the output unit 25 switches an output signal from the FITS header to image data. Thereby, image data is output after the FITS header.

Figure 6:
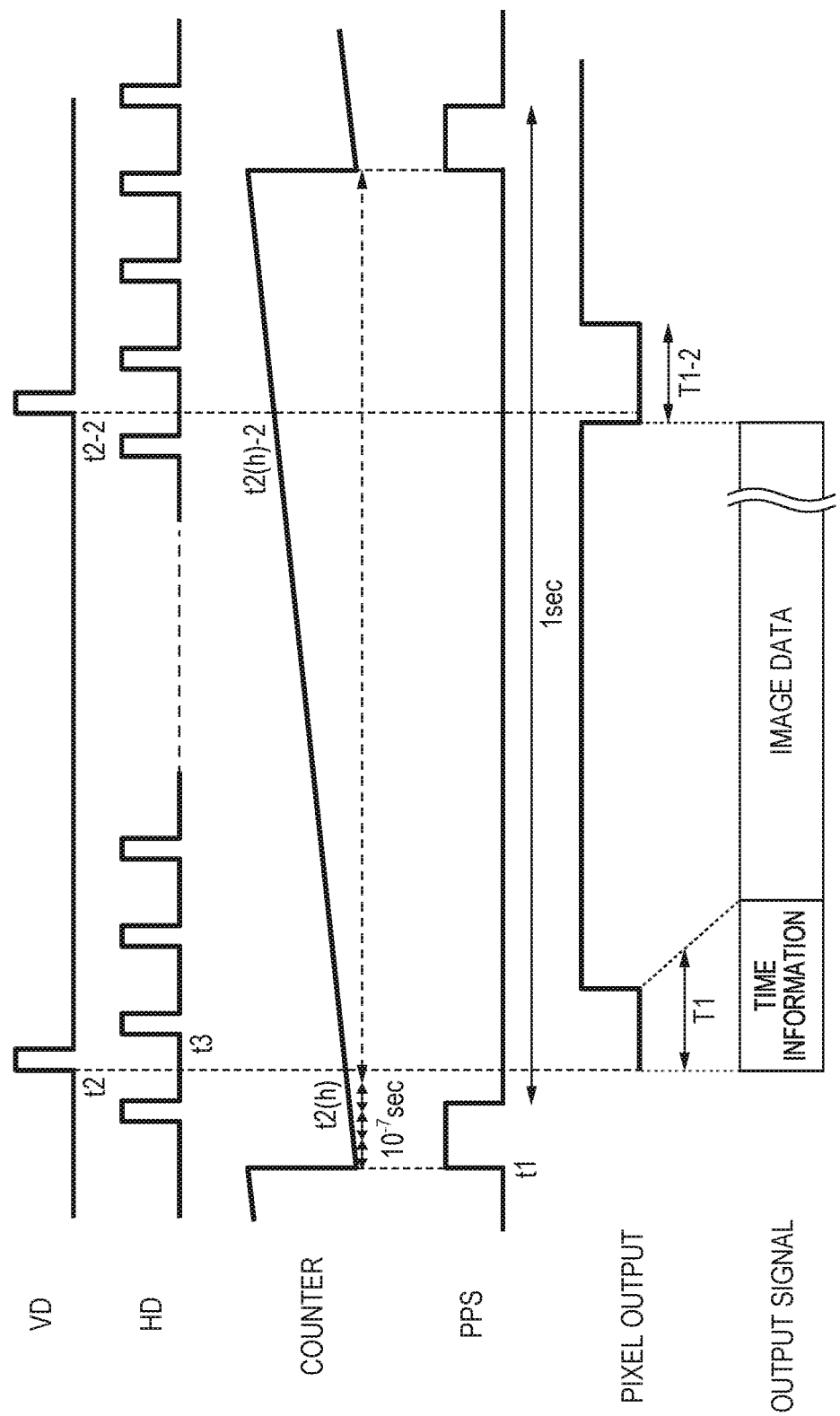
FIG. 6 is a timing chart of the imaging system according to the first embodiment of the present invention.

FIG. 6 is a timing chart of the imaging system according to the present embodiment and represents the vertical synchronization signal VD, the horizontal synchronization signal HD, the counter, the PPS signal, the pixel output, and the output signal. The counter is a digital value counted up every $10^{-7}$ seconds in the time information generation unit 22 and reset a rising edge of the PPS signal of GPS.

In response to the imaging system being powered on, the synchronization signal output unit 30 outputs the vertical synchronization signal VD, the horizontal synchronization signal HD, and the control signal, and the imaging device 10 starts an image capturing operation. The time information acquisition unit 40 receives radio waves from GPS satellites and starts acquiring GPS position information and GPS time information.

At time t1, when acquiring the PPS signal from the received radio wave, the time information acquisition unit 40 outputs the PPS signal to the time information generation unit 22. When detecting a rising edge of the PPS signal, the time information generation unit 22 resets the counter. By using the counter 23 reset in synchronization with the PPS signal, it is possible to generate time information in the order of microsecond, which has a higher time resolution than one second that is the update period of GPS time information. At the same time as the time t1, the time information acquisition unit 40 acquires the GPS time information including the GPS week information and the GPS second information from the received radio wave and converts the GPS time information into time information in a form of year/month/day/hour/minute/second. GPS time information is acquired every one second of the PPS signal without being synchronized with a drive timing of the imaging device 10.

At time t2, when the vertical synchronization signal VD transitions to the high level and then transitions to the low level, a vertical scan period for one frame starts in the imaging device 10. The vertical synchronization signal VD is a signal not synchronized with the PPS signal. The time information generation unit 22 outputs the counter value at the time t2 to the output unit 25 as time information t2(h). In a period T1, the output unit 25 outputs the time information t2(h), position information, and the like as a FITS header. Thereby, the time t2 that is the start time of a first vertical scan period can be stored with a time resolution of $10^{-7}$ seconds. The period T1 corresponds to a signal processing period, and the signal processing unit 21 performs an analog-to-digital conversion process, a gradation correction process such as a gamma process, a white balance correction process, a demosaicing process, a noise reduction process, signal processing by utilizing the OB, or the like. The signal processing in the period T1 is not necessarily limited to these examples and may be a delay period of image data, a blanking period, a period before image data is output, or a delay time of signal output. That is, the period T1 may include various periods required for signal processing, output, or the like of image data.

At time t3, when the horizontal synchronization signal HD transitions to the high level and then transitions to the low level, a first horizontal scan period starts in the imaging device 10. Note that, in the following description, time of a rising edge and time of a falling edge of the horizontal synchronization signal HD may be collectively referred to as start time of a horizontal scan period. In the imaging device 10, the row scanning circuit 120 selects first to fourth pixel rows, and the column readout circuits 130A and 130B read the pixel signals for four rows. The signal processing unit 21 converts the pixel signal into digital image data and performs signal processing such as noise reduction, gain processing, or the like on the image data. Subsequently, in the same manner, the pixel signals for four rows are read in each horizontal scan period and converted into image data of digital signals in the signal processing unit 21. After the period T1, the output unit 25 outputs image data in the first vertical scan period.

At time t2-2, when the vertical synchronization signal VD transitions to the high level and then transitions to the low level, a vertical scan period for a second frame starts. The time information generation unit 22 outputs the counter value at the time t2-2 to the output unit 25 as time information t2(h)-2. In a period T1-2, the output unit 25 outputs a FITS header. That is, before image data is output from the signal processing unit 21, the time information t2(h)-2 associated with the second frame is output. After the period T1-2, the output unit 25 outputs image data of the second frame. In such a way, before image data is output from the signal processing unit 21, accurate time information is generated and output for each vertical scan period, that is, for each frame.

Figure 7:
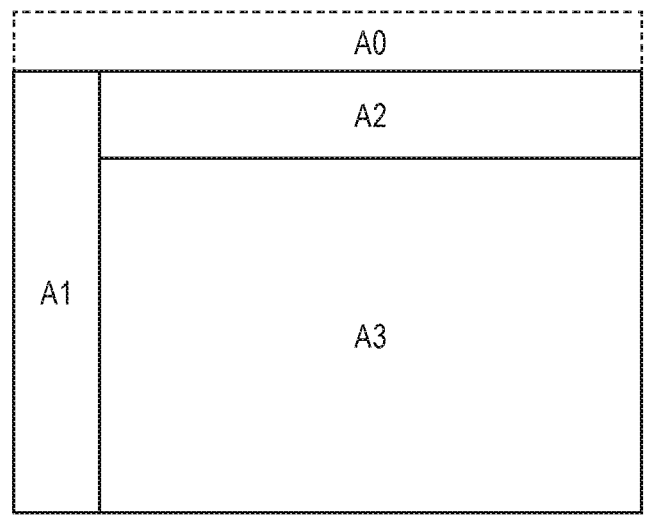
FIG. 7 is a diagram illustrating a method of adding time information to image data according to the first embodiment of the present invention.

FIG. 7 is a diagram illustrating a method of adding time information to image data according to the present embodiment and represents image data and a header for one frame output from the output unit 25. Image data for one frame includes data parts A1, A2, and A3. The data part A1 corresponds to a horizontal OB pixel region, and the data part A2 corresponds to a vertical OB pixel region. The data part A3 corresponds to an effective pixel region.

The data part A0 corresponds to a FITS header such as time information and is added to the upper part (preceding time) of image data of one frame. When data of one pixel is represented by 16-bit data, that is, by 2 bytes, information such as an ASCII code, other 2-byte characters, or the like for one pixel can be written to the data part A0.

Note that, the data part A1 in the horizontal OB pixel or the data part A2 of the vertical OB pixel may be replaced with time information to add accurate time information for each horizontal scan period. In this case, a timing to determine time information is at the horizontal synchronization signal HD, that is, the start time of outputting image data for one scanning row. Therefore, data of the head part of the horizontal OB that is the closest to the horizontal synchronization signal HD may be replaced with the data part A1 of time information.

Figure 8:
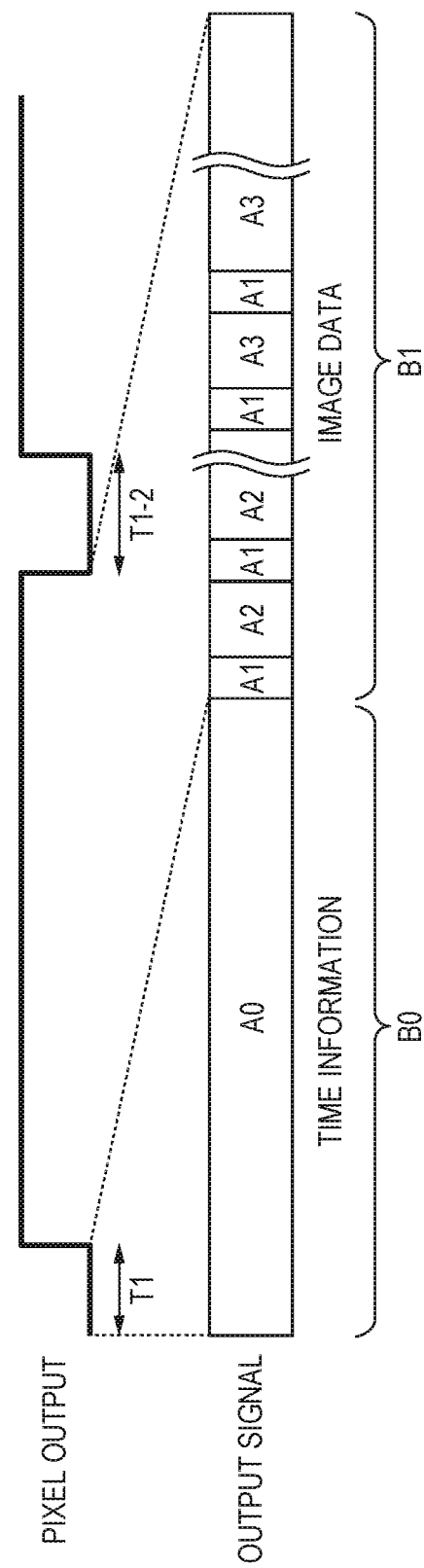
FIG. 8 is a diagram illustrating details of an output signal according to the first embodiment of the present invention.

Subsequently, the details of the output signal according to the present embodiment will be described with reference to FIG. 8, FIG. 9, and FIG. 10. FIG. 8 is a diagram representing the details of the output signal according to the present embodiment. FIG. 9 and FIG. 10 are diagrams illustrating a FITS format.

A file in the FITS format is formed of a FITS header B0 that is metadata represented by an ASCII text and an ASCII or binary data array B1. In the present embodiment, the output signal from the output unit 25 includes the FITS header B0 and the binary data array B1. That is, as illustrated in FIG. 8, the output unit 25 outputs the FITS header B0 such as time information in the periods T1 and T1-2 and outputs the binary data array B1 after the periods T1 and T1-2. The FITS header B0 and the data array B1 are formed of a plurality of FITS blocks (records), and the size of one FITS block is 2880 bytes (23040 bits). Since image data obtained by the imaging system of the present embodiment has 2160 horizontal pixels and 1200 vertical pixels and data of one pixel has 16 bits, image data of one frame is formed of 441472000 bits of data=2160×1200×16. Therefore, image data of one frame can be formed of 1800 FITS blocks (441472000/23040=1800). Here, by converting time information, image capturing information, and the like into data having the same number of bits as the number of bits of one pixel in image data and adding a FITS header to the image data, it is possible for the output unit 25 to handle image data as FITS data.

As illustrated in FIG. 9, a single FITS block includes a plurality of keyword records, and each keyword record is formed of information of 80 bytes (80 characters). The FITS header B0 formed in such a way can represent information related to data such as a purpose, a type, the structure, the number of bytes, the number of records, or the like of data. In one FITS block, a character string of 36 lines=2880 bytes/80 bytes can be described. When a FITS header is more than 36 lines, a plurality of FITS blocks can be used. Further, when a FITS header B0 is smaller than one FITS block, the remaining region of the FITS block is filled with blank data.

In the same manner as the FITS header B0, the data array B1 is formed of one or more FITS blocks. When image data of one frame is more than 2880 bytes, a plurality of FITS blocks may be included in the data array B1. Further, image data of one frame is smaller than one FITS block, the output unit 25 fills the remaining region of the FITS block with blank data. Image data for each row is arranged sequentially in the data array B1. That is, in a readout period of the vertical OB pixel of image data of one frame, the data parts A1 and A2 are alternately output from the output unit 25, and in a readout period of the effective pixel region, the data parts A1 and A3 are alternately output from the output unit 25.

An example of the FITS header B0 will be illustrated in FIG. 10. Each of the FITS header B0 is formed of a plurality of keyword records of 80 characters (80 digits), and the number of keyword records are unlimited. The required keywords and the order of keywords are determined, however, and the last keyword record is represented by the keyword "END". The keyword record is represented by "keyword=value/comment" and includes a keyword of the first to eighth digits (ASCII code of left-aligned characters up to 8 characters), "=" (equal sign) of the ninth digit, "(space)" (blank represented by "0x20" or "20H" in hexadecimal ASCII code) of the tenth digit. However, the keywords "HISTORY", "COMMENT", and a blank are exceptions and do not follow the rules described above. Further, the keywords are represented in capital letters, and the comments are represented in small letters.

A value (parameter) is described in accordance with a fixed format. Some essential parameters are required to be described in a fixed format, and other parameters are also recommended to be described in accordance with a format. While the standard number of characters of a character-type variable is eight, it is not necessarily limited to eight. In the character-type variable, "'" is described in the 11th digit, and then the character string and the terminal "'" are described. In the logic-type variable, "T" or "F" is described in the 30th digit. In the integer-type variable, variables are described right-aligned in the 11th to 30th digits. Further, in the real number-type variable, variables are described right-aligned in the 11th to 30th digits. The decimal point is described when the real number-type variable has a decimal part, and "E" or "D" is described when a variable has an exponent part. The minimum required keywords are "SIMPLE", "BITPIX", "NAXIS", "NAXISn", and "END", and the order of the descriptions from "SIMPLE" to "NAXISn" is determined in accordance with the format described above.

The keyword "SIMPLE" is a logic-type variable and represents whether or not the file conforms to the FITS standard. The keyword "BITPIX" is an integer-type variable and represents the number of bits used to express each data value. The keyword "NAXIS" is an integer-type variable and represents the number of coordinate axes of data array. The keyword "NAXISn" is an integer-type variable with "n" representing from 1 to the value of "NAXIS" and represents the number of data along the n-th axis, respectively. The keyword "END" has no value, and the 9th to 80th digits are filled with blanks to represent the end of the header record. In the present embodiment, when the output unit 25 detects the keyword "END" in the FITS header B0, the output signal is switched from the FITS header B0 to the data array B1. A character "/" is described anywhere subsequent to a parameter, and at least one blank and then a comment are appended to a slash. In the present embodiment, while the comments of the keywords appended to a slash are described, other information may be described. Further, a blank may be appended to a slash.

In FIG. 10, the keywords "SIMPLE" to "BSCALE" each are the fixed information as described previously. The keywords "BITPIX" to "BSCALE" represent a specification of image data acquired in the imaging system of the present embodiment. For example, since each pixel value is represented in 16-bits, the value of "BITPIX" is "16". Further, since the image data is two-dimensional image data, the value of "NARIS" is "2". The keyword "NAXIS1" represents the number of horizontal pixels of an image, which is "2160", for example, and the keyword "NAXIS2" represents the number of vertical pixels of an image, which is "1200", for example. The keywords "SIMPLE", "EXTEND", and "COMMENT" represent information on the FITS format. The keyword "BZERO" represents a zero-point at which the pixel value is converted into a physical value, and the keyword "BSCALE" represents a scale by which a pixel value is converted into a physical value.

The keywords "EXPTIME" to "DATE" each are time information corresponding to image capturing of a frame. The keyword "EXPTIME" represents the exposure time for a frame and is acquired from the setting value of the imaging system. The keyword "S-OPEN" is the exposure start time of a frame and is the accurate time information t(h) generated from time of a rising edge of the vertical synchronization signal VD at the start of image capturing of a frame in the present embodiment. The keyword "S-CLOSE" is the exposure end time of a frame and is calculated from the keywords "EXPTIME" and "S-OPEN". The time information t(h) is generated based on a PPS signal of GPS that is absolute time information. The keyword "LOCKED" is described in "GPS-STAT" when acquisition of a PPS signal is valid, and the keyword "UNLOCKED" is described in the keyword "GPS-STAT" when acquisition of a PPS signal is invalid. By referencing to the keyword "GPS-STAT" as described above, it is possible to determine whether the keywords "S-OPEN" and "S-CLOSE" are correct or incorrect.

The keyword "DATE" is an image capturing start time of the frame acquired from system time of the imaging system. The system time may be supplied from a clock circuit provided inside the imaging system, for example. Since the keyword "DATE" represents the system time of the imaging system, it may not be necessarily accurate time information such as the time information t(h). When GPS time information is not acquired, however, the keyword "DATE" may be used alternatively. The keyword "FRAME-NO" represents a frame number and is counted up for each frame. By referencing to the keyword "FRAME-NO", it is possible to confirm loss of continuously captured frames. The keyword "CAM-GAIN" represents the gain setting value of the imaging device 10, and the keyword "LENS-F" represents the F-number of the lens in the optical system 10a.

In the values described above, each value of the keyword "S-OPEN" (time information t(h)), "EXPTIME", and "S-CLOSE" is generated in real time in the header generation unit 243. Further, the keyword "SIMPLE", "BITPIX", "NAXIS", "NAXIS1", "NAXIS2", "EXTEND", "COMMENT", "BZERO", "BSCALE", comments appended to "/" (slash), or the like is included in a FITS header as a fixed value. That is, these fixed values are synthesized in the order of designated keyword records together with information generated in real time such as time information, setting values of the imaging system, or the like, and output as a FITS header.

Each of the keywords, fixed values, and comments is information related to the imaging system and the imaging device and can be acquired or generated regardless of the timing of importing the frame. Thus, it is possible to acquire or generate a fixed value or the like in advance before a rising edge of the vertical synchronization signal VD to convert the acquired and generated fixed value or the like into ASCII characters and hold the converted fixed value or the like within the imaging system. Further, a predetermined value may be held as a fixed value of ASCII characters without acquiring information from the imaging system and the imaging device.

Note that, while the fixed values are the keywords "SIMPLE" to "BSCALE" in the present embodiment, the fixed value may be another information in accordance with the imaging device or image data. A value that does not change for each frame such as the keyword "CAM-GAIN", "LENS-F", or the like may be held as the fixed value in advance, for example. Information acquired at image capturing may be a predetermined fixed value. Further, a fixed value may be the name of the imaging system, the serial numbers of the imaging device and the imaging system, temperature information of the imaging device and the imaging system, GPS time information, longitude and latitude information, the type of the lens, zooming position information, or the like. In fixed value information and each keyword, the rules not described above follow the FITS standard.

As described above, in the present embodiment, by generating and outputting time information before image data is output from the signal processing unit 21 on a frame basis, it is possible to prevent frame loss and to stably output time information and image data. Here, as a comparative example, a case where time information is held until image data is output from the output unit 25 and then added to image data at a stage of outputting image data for one frame is considered. In this case, it is required to perform a series of processing simultaneously such as readout of time information held in the memory, conversion of image data into a FITS data form, generation of a FITS header that combines time information and other information, addition of a FITS header to image data, or the like. In high-speed continuous image capturing, since processing is not complete for all continuous frames, frame loss occurs, and accuracy in recording an image is degenerated. In particular, since more than or equal to 60 fps is required for observation of an orbit close to the earth in the space astronomical field, and more than or equal to 100 fps is required for recent cameras for scientific measurement, frame loss may occur. In contrast, according to the present embodiment, since a FITS header is generated and output in the signal processing period before image data is output from the signal processing unit 21, the output period of image data is not limited by generation and output of a FITS header. That is, by generating and outputting a FITS header by utilizing a signal processing period of image data, it is possible to avoid frame loss in high-speed moving image capturing and to output a FITS file having accurate time information.

In space observation, when capturing a moving image of a moving object such as a meteor, space debris, or the like, position information of the moving object and accurate absolute time information thereof are important to calculate the accurate orbit of the moving object. The absolute time here indicates, for example, the international atomic time defined by Universal Time Coordinated (UTC) or the like. Further, in the field of so-called remote sensing in which a distant object is observed, image capturing of a moving object or image capturing from a moving object such as an aircraft, an artificial satellite, or the like is performed. Also in these cases, with location information of an object relative to the earth and accurate time information, more information can be obtained for the object. According to the present embodiment, for example, when capturing a moving image of a moving object such as a meteor, space debris, or the like in space observation, it is possible to store a frame and accurate absolute time information in association with each other.

Further, in the present embodiment, a timing to determine accurate time information is at the vertical synchronization signal VD, that is, acquisition start time of one frame image data. By determining and outputting time information before image data, it is possible to handle time information as a FITS header of a FITS file. Note that the present embodiment does not necessarily require to use a FITS file, and a format other than the FITS file may be used as long as time information of image capturing can be added. In FIG. 8, for example, time information may be embedded in the upper side of the vertical OB pixel region (data part A2), that is, the lower bits of the data part A0 of the preceding time and the time information may be output. Further, in the case of all-pixel global exposure by an electronic shutter, time information may be output on the left side of the horizontal OB pixel region (data part A1), that is, the preceding time. The horizontal OB pixel region (data part A1) or the vertical OB pixel region (data part A2) may be replaced with time information and output. Furthermore, only the header (data part A0) and the effective pixel region (data part A3) may be output except the horizontal OB pixel region (data part A1) and the vertical OB pixel region (data part A2). Further, also when output is performed as a FITS file, only the effective pixel region may be output after the header.

While the output unit 25 adds time information to each frame, the present invention is not limited thereto. A frame storing time information may be one of two frames such as an even frame and an odd frame or any one of a plurality of frames or may be a randomly selected frame. Furthermore, time information may be stored only in the frame recognized as a subject. Further, as long as the association between time information and the frame in which an image is captured is clear, time information may be output separately from image data. In such a way, a frame storing time information can be appropriately changed in accordance with the conditions such as an output format of image data, a memory capacity, a specification of driving of the imaging device, acquired information, or the like.

In the present embodiment, while time information used as the reference of a counter in a unit of $10^{-7}$ seconds is a PPS signal obtained from a GPS satellite, the present invention is not limited thereto. A standard radio wave may be received, and information on a time server may be acquired from the network, for example. Further, while the synchronization signals VD and HD are generated by the synchronization signal output unit 30, the import time of the counter (time t2 in FIG. 6) may be acquired by detecting a synchronization signal generated by the imaging device 10. Further, the counter having a period of 10 MHz, that is, $10^{-7}$ seconds is not limited to the example described above as long as the PPS signal as a reference for the counter and a high time resolution are ensured. Further, while the example in which the time information generation unit 22 is provided outside the imaging device 10 has been described in the present embodiment, the imaging device 10 may have the time information generation unit 22.

Further, while the timing for importing time information is the time of a rising edge of the vertical synchronization signal VD (time t2 in FIG. 6) in the present embodiment, various time may be used as a reference as long as the timing is associated with a frame. For example, time information may be imported at the time of a falling edge of the vertical synchronization signal VD, or time information may be imported at the horizontal scan start timing synchronized with the vertical synchronization signal VD. Further, a time period from the time t2 to the time when the output unit 25 outputs image data may be measured, and a value obtained by adding the measured time to the time t2 may be output as time information. Further, the exposure start time or the exposure end time for each frame may be used. As described above, as long as the timing is synchronized with the vertical synchronization signal VD, it is possible to import time information at various timings.

Second Embodiment

Next, an imaging system according to a second embodiment will be described. While the imaging device 10 in the first embodiment is operated by rolling shutter, the imaging device 10 in the present embodiment can be operated by global electronic shutter. The present embodiment will be described below mainly for a configuration different from the first embodiment.

Figure 11:
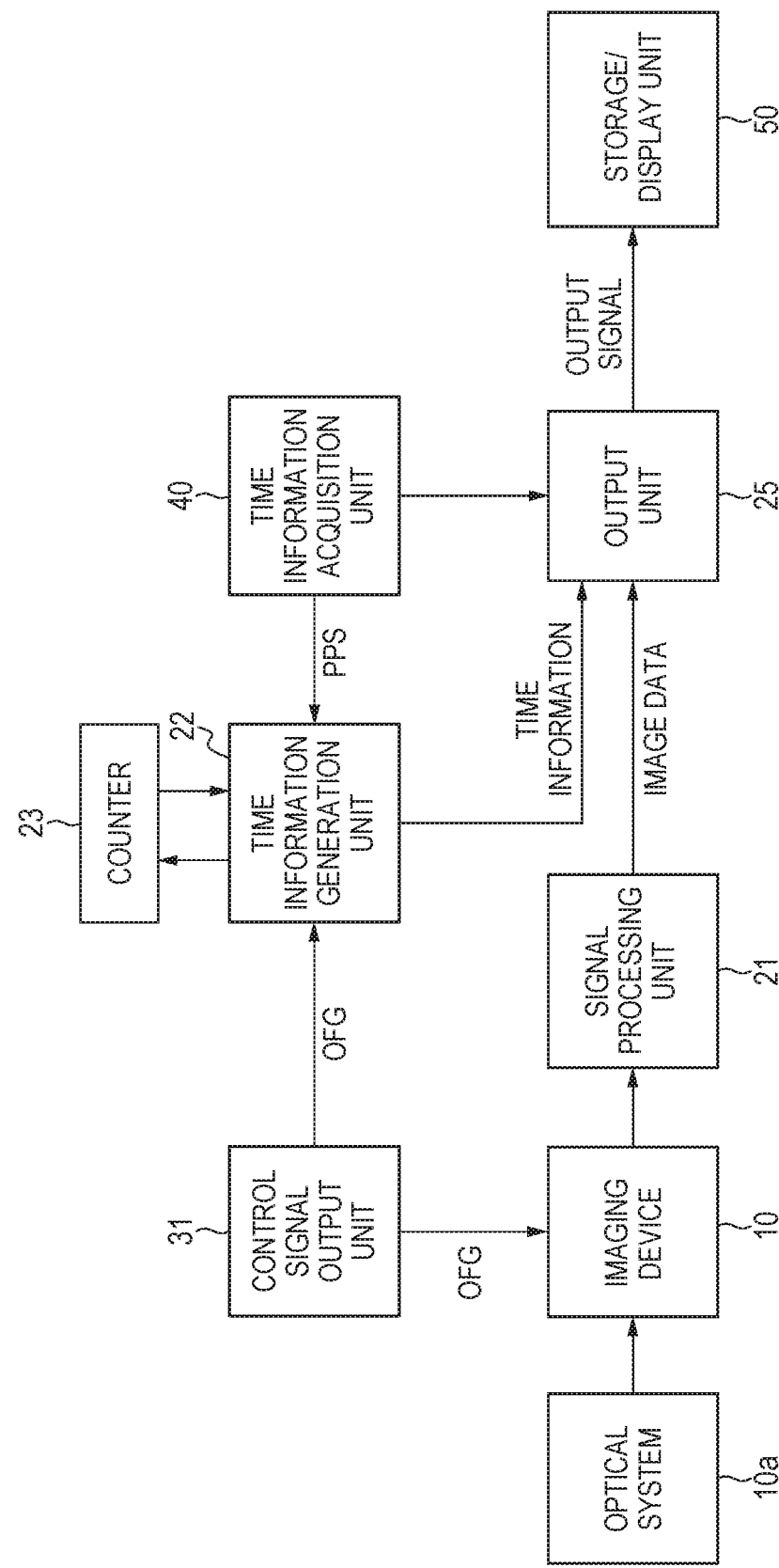
FIG. 11 a block diagram of an imaging system according to a second embodiment of the present invention.

FIG. 11 is a block diagram of an imaging system according to a second embodiment of the present invention. The imaging system has the optical system 10a, the imaging device 10, the signal processing unit 21, the time information generation unit 22, the counter 23, the output unit 25, a control signal output unit 31, the time information acquisition unit 40, and the storage/display unit 50. The control signal output unit 31 outputs a control signal OFG for collectively resetting the photoelectric conversion units PD to imaging device 10 and the time information generation unit 22. When the control signal OFG transitions from a high level to a low level, global exposure in the pixel unit 100 starts. The time information generation unit 22 can output a counter value at the time when a control signal TX1 transitions from a high level to a low level as accurate time information.

Figure 12:
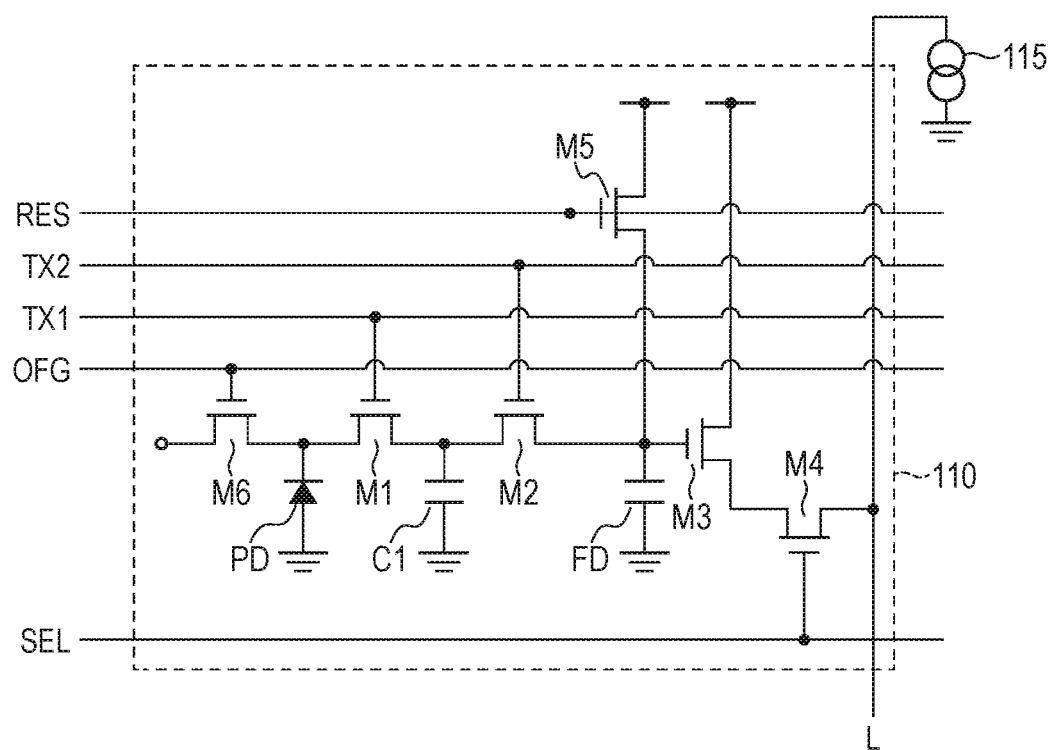
FIG. 12 is an equivalent circuit diagram of a pixel according to the second embodiment of the present invention.

FIG. 12 illustrates an equivalent circuit of the pixel 110 according to the present embodiment. The pixel 110 has the photoelectric conversion unit PD, a holding unit C1, the floating diffusion portion FD, a first transfer transistor M1, a second transfer transistor M2, the amplification transistor M3, the select transistor M4, the reset transistor M5, and an overflow transistor M6. When turned on, the first transfer transistor M1 transfers charges of the photoelectric conversion unit PD to the holding unit C1, and the holding unit C1 holds the charges transferred from the photoelectric conversion unit PD. By driving the first transfer transistor M1 at the same time in all the pixels 110, it is possible to collectively control the timing of the end of exposure of the photoelectric conversion unit PD. That is, by controlling the control signals TX1 on each row to be turned on or off at the same time, it is possible to simultaneously control the exposure timings in all the pixels 110. When turned on, the overflow transistor M6 can drain charges of the photoelectric conversion unit PD to an overflow drain such as a power supply node. According to the present embodiment, while the holding unit C1 holds charges, the photoelectric conversion unit PD can accumulate newly generated charges, and it is possible to implement a global electronic shutter function by which timings of photoelectric conversion in all the pixels 110 are matched.

Figure 13:
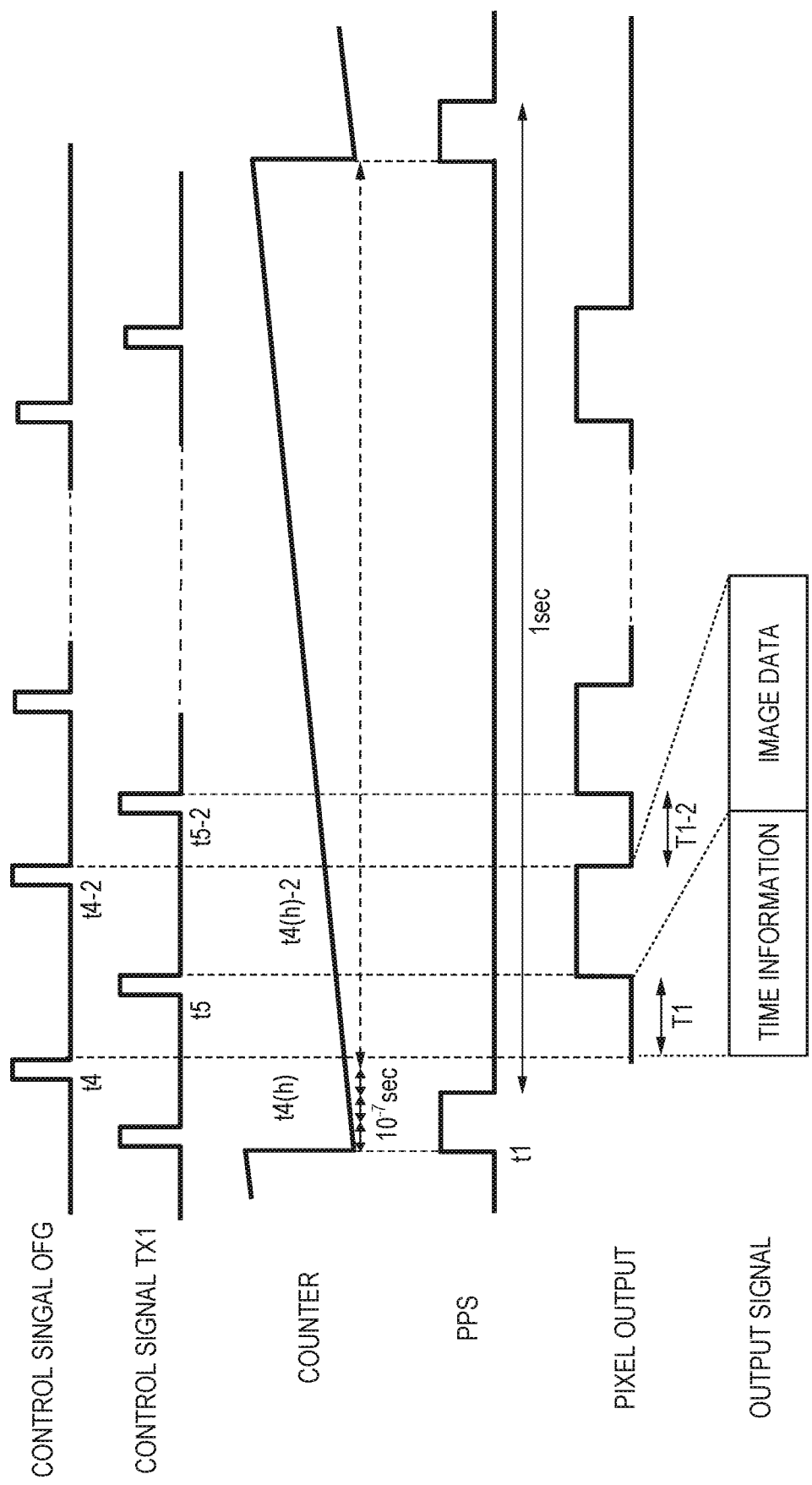
FIG. 13 is a timing chart of the imaging system according to the second embodiment of the present invention.

FIG. 13 is a timing chart of the imaging system in the present embodiment. At the time t1, when a rising edge of a PPS signal is detected, the time information generation unit 22 resets the counter and counts up the counter every $10^{-7}$ seconds. When the control signal OFG transitions to a high level in all the pixels 110, the overflow transistor M6 is turned on, and charges of the photoelectric conversion unit PD are drained. When the control signal OFG transitions from the high level to the low level at the time t4, the overflow transistor M6 is turned off, and the exposure period in the photoelectric conversion unit PD starts in all the pixels 110. At the same time, the time information generation unit 22 outputs the counter value at the time t4 to the output unit 25 as time information t4($h$). In the period T1 (from the time t4 to the time t5), the output unit 25 outputs the time information t4($h$), position information, and the like as a FITS header.

In all the pixels 110, when the control signal TX1 transitions to the high level, the first transfer transistor M1 is turned on, and charges of the photoelectric conversion unit PD are transferred to the holding unit C 1. At the time t5, the control signal TX1 transitions to the low level in all the pixels 110, and the exposure period ends. The pixel signals on each row are then sequentially read by the column readout circuits 130A and 130B and output from the imaging device 10. The output unit 25 prepends a FITS header including time information to image data of one frame. Thereby, the time information t4($h$) on the exposure start of all the pixels 110 can be recorded with a high time resolution.

Similarly, in the next frame, when the control signal OFG transitions to a high level, the overflow transistor M6, and charges of the photoelectric conversion unit PD are drained. At the time t4-2, when the control signal OFG transitions from the high level to the low level, an exposure period is started in the all the pixels 110. The time information generation unit 22 outputs the counter value at the time t4-2 as time information t4($h$)-2. In the period T1-2 (from the time t4-2 to the time t5-2), the output unit 25 outputs the time information t4($h$)-2, position information, and the like as a FITS header. In such a way, in each frame of a moving image, image capturing having the same exposure period is performed, and time information on the start of exposure t4($h$), t4($h$)-2, . . . , are prepended to image data as a FITS header.

In the present embodiment, the periods T1, T1-2, . . . , correspond to the exposure period in all the pixels 110, and a FITS header is output in each exposure period. The FITS header includes information such as time information on the start of exposure t4(h), the exposure time, a frame number, the number of imported rows, or the like. Image data is converted into the FITS file form and output after the FITS header.

By generating and outputting time information by using a signal processing period obtained before image data is output, it is possible to stably output image data without causing frame loss or the like. Further, by outputting time information and image data from the imaging system as the FITS file for each frame, it is possible to quickly record time information and image data in an apparatus on the receiver side.

In the present embodiment, while the time information generation unit 22 imports time information by using the control signal OFG output from the imaging device 10, other configurations may be used as long as exposure start time can be detected. The exposure start time may be detected, based on a signal synchronized with the control signal OFG, for example. Further, the timing to import time information is not limited to time of a falling edge of the control signal OFG and may be time of a rising edge thereof. Further, when the exposure time period can be controlled or detected, time information at the exposure end time t5, that is, the time of falling edge of the control signal TX1 may be output. In this case, by subtracting the exposure time period (t5 to t4) from the exposure end time t5, it is possible to know the exposure start time t4. Further, when a time period required for outputting image data for one frame can be controlled or detected, the end time of image data output may be output, and the exposure start time may be calculated from the end time.

Note that, while the imaging system according to the present embodiment outputs the exposure start time as time information, the imaging system may further include the exposure end time in time information for output. That is, the time information generation unit 22 outputs time information at a timing when the control signal TX1 changes from a high level to a low level, and thereby the exposure end time can be included in the header. As described above, as long as high-resolution time information synchronized with driving of the imaging device 10 can be associated with each frame, it is possible to use time information at various signals and timings.

Third Embodiment

Figure 14:
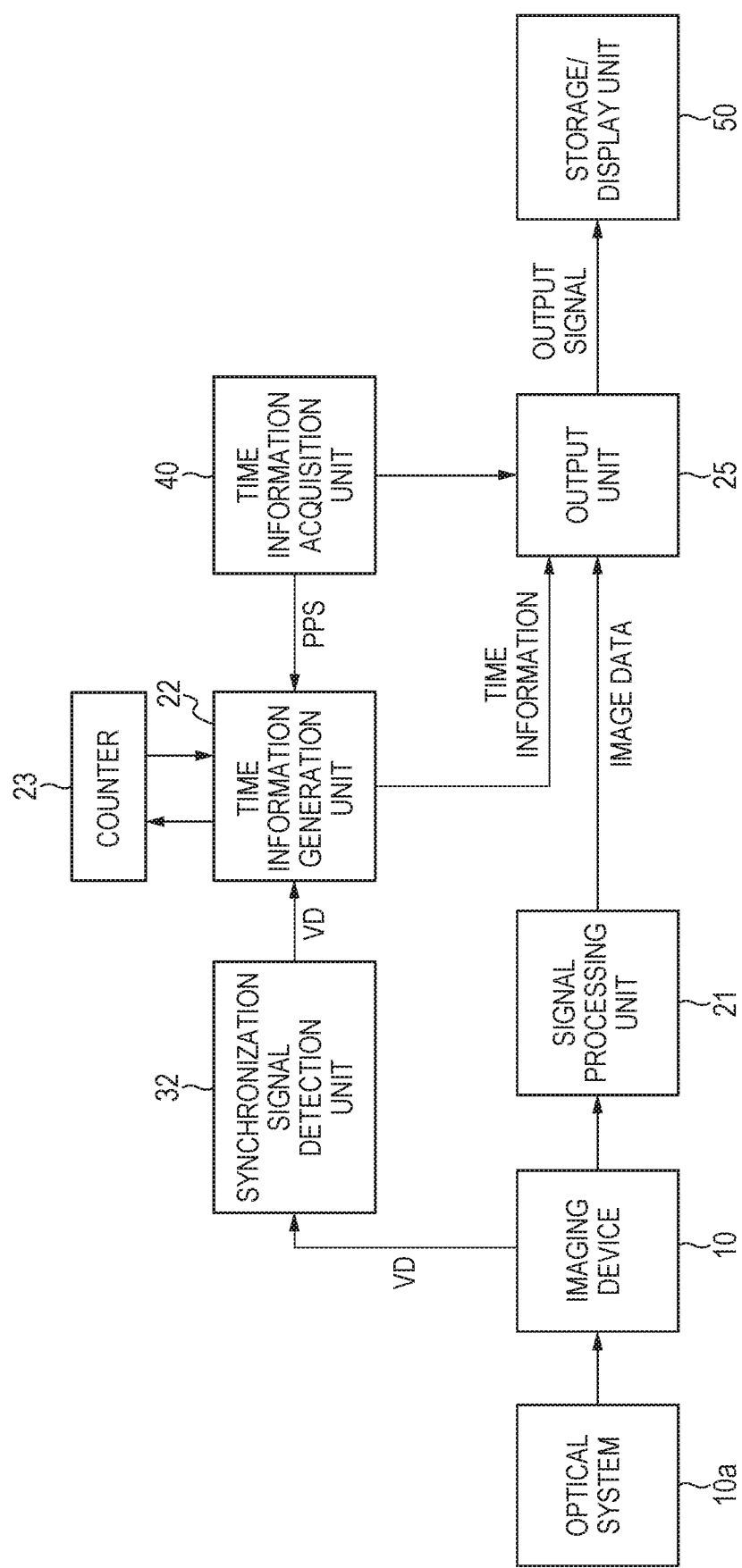
FIG. 14 a block diagram of an imaging system according to a third embodiment of the present invention.

FIG. 14 is a block diagram of an imaging system in the present embodiment. In the imaging system in the first embodiment, time information is imported by using the vertical synchronization signal VD output from the synchronization signal output unit 30. In contrast, in the imaging system in the present embodiment, by detecting the vertical synchronization signal VD of the imaging device 10, it is possible to import time information. The present embodiment will be described below mainly for a feature different from the first embodiment.

In FIG. 14, the imaging system has the optical system 10a, the imaging device 10, the signal processing unit 21, the time information generation unit 22, the counter 23, the output unit 25, a synchronization signal detection unit 32, the time information acquisition unit 40, and the storage/display unit 50. The synchronization signal detection unit 32 has a function of detecting and outputting the vertical synchronization signal VD generated in the imaging device 10. The vertical synchronization signal VD output from the synchronization signal detection unit 32 is input to the time information generation unit 22. The time information generation unit 22 outputs a counter value at the time when the vertical synchronization signal VD changes from a low level to a high level as accurate time information. Since the other configurations and operations are the same as those of the first embodiment, the description thereof will be omitted.

According to the present embodiment, even when the imaging device 10 generates the vertical synchronization signal VD, it is possible to output accurate time information associated with the frame by detecting the vertical synchronization signal VD outside the imaging device 10. Note that the synchronization signal detection unit 32 may detect the horizontal synchronization signal HD in addition to the vertical synchronization signal VD.

Fourth Embodiment

Figure 15:
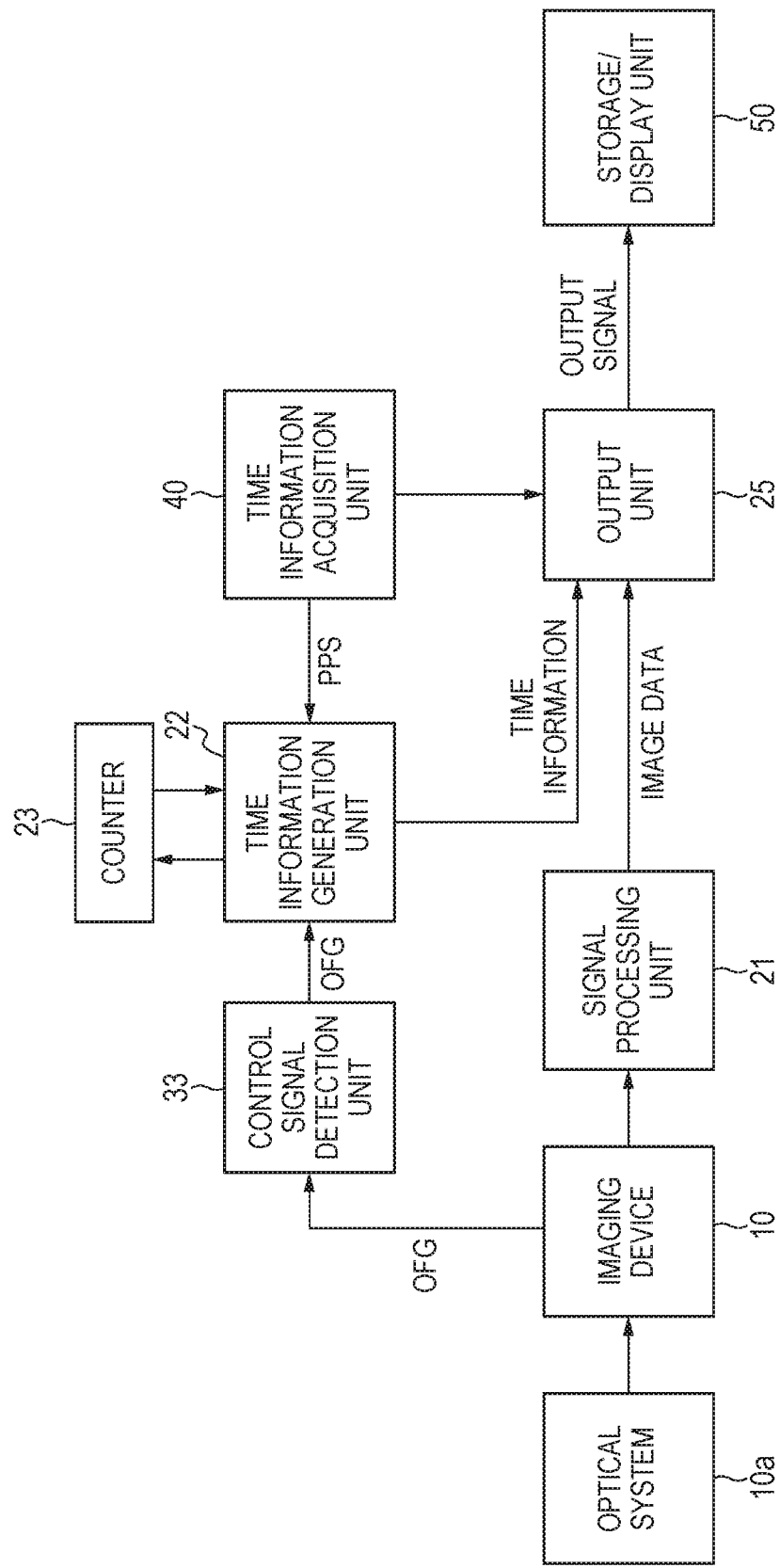
FIG. 15 a block diagram of an imaging system according to a fourth embodiment of the present invention.

FIG. 15 is a block diagram of an imaging system in the present embodiment.

In the second embodiment, the control signal output unit 31 outputs the control signal OFG used for resetting the photoelectric conversion unit PD. The imaging system in the present embodiment has a control signal detection unit 33 that detects the control signal OFG generated in the imaging device 10. The present embodiment will be described below mainly for a feature different from the second embodiment.

In FIG. 15, the imaging system has the optical system 10a, the imaging device 10, the signal processing unit 21, the time information generation unit 22, the counter 23, the output unit 25, the control signal detection unit 33, the time information acquisition unit 40, and the storage/display unit 50. The control signal detection unit 33 has a function of detecting and outputting the control signal OFG generated in the imaging device 10. The control signal OFG output from the control signal detection unit 33 is input to the time information generation unit 22. The time information generation unit 22 outputs a counter value at the time when the control signal OFG transitions from a high level to a low level as accurate time information. Since the other configurations and operations are the same as those of the second embodiment, the description thereof will be omitted.

Also in a case where the imaging device 10 generates the control signals OFG, TX1, or the like, it is possible to output accurate time information of the start or the end of exposure by detecting the control signals OFG, TX1, or the like outside the imaging device 10.

Another Embodiment

The embodiments described above are a mere example of the present invention, and modifications can be made within the scope not departing from the spirit of the present invention. For example, the imaging device is not limited to a CMOS image sensor and may be a CCD image sensor. Further, an internal clock that is periodically calibrated by a radio wave of a GPS satellite is provided inside the imaging system, and when it is difficult to receive a radio wave from a GPS satellite, absolute time information may be generated based on the internal clock.

Further, the imaging apparatus according to the present invention may be formed of a general-purpose computer. A program used for performing the control method of the imaging apparatus may be pre-stored in the imaging apparatus and can be supplied to the imaging apparatus via a storage medium or a network.

According to the present invention, it is possible to provide the imaging apparatus, the imaging system, and the control method of the imaging apparatus that can stably add time information to image data at the time of capturing a moving image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-114263, filed Jun. 15, 2018, which is hereby incorporated by reference herein in its entirety.

What is claimed is:

1. An imaging apparatus comprising:
    a pixel unit having a plurality of pixels;
    a signal processing unit that generates image data by performing signal processing on a pixel signal read from the pixel unit and outputs the image data on a frame basis;
    an information generation unit that generates time information on a frame basis; and
    an output unit that outputs the time information associated with one frame before output of the image data of the one frame from the signal processing unit is started and starts output of the image data of the one frame after an end of the output of the time information ends.

2. The imaging apparatus according to claim 1, wherein the output unit outputs the time information in at least a part of a period in which the signal processing unit performs the signal processing.

3. The imaging apparatus according to claim 1,
    wherein the pixel unit comprises a light-shielded optical black pixel, and
    wherein the output unit outputs the time information in a period corresponding to the optical black pixel.

4. The imaging apparatus according to claim 2,
    wherein the pixel unit comprises a light-shielded optical black pixel, and
    wherein the output unit outputs the time information in a period corresponding to the optical black pixel.

5. The imaging apparatus according to claim 3, wherein the signal processing includes an analog-to-digital conversion process in the pixel signal and processing using the optical black pixel.

6. The imaging apparatus according to claim 4, wherein the signal processing includes an analog-to-digital conversion process in the pixel signal and processing using the optical black pixel.

7. The imaging apparatus according to claim 1, wherein the time information corresponds to a start time of a vertical scan in the pixel unit.

8. The imaging apparatus according to claim 2, wherein the time information corresponds to a start time of a vertical scan in the pixel unit.

9. The imaging apparatus according to claim 7, wherein the output unit outputs the time information at any time between the start time of the vertical scan in the pixel unit and time when the signal processing unit outputs the image data.

10. The imaging apparatus according to claim 8, wherein the output unit outputs the time information at any time between the start time of the vertical scan in the pixel unit and time when the signal processing unit outputs the image data.

11. The imaging apparatus according to claim 7, wherein the information generation unit detects a signal synchronized with the vertical scan and generates the time information.

12. The imaging apparatus according to claim 8, wherein the information generation unit detects a signal synchronized with the vertical scan and generates the time information.

13. The imaging apparatus according to claim 1, wherein the time information corresponds to a start time of global exposure in the pixel unit.

14. The imaging apparatus according to claim 13, wherein the output unit outputs the time information at any time between the start time of the global exposure and time when the signal processing unit outputs the image data.

15. The imaging apparatus according to claim 13, wherein the information generation unit detects a signal synchronized with the global exposure and generates the time information.

16. The imaging apparatus according to claim 1, wherein the information generation unit further generates, as image capturing information, at least one of information of position information, information representing an image capturing condition, information on exposure time in the plurality of pixels, and information on a frame number of the image data.

17. The imaging apparatus according to claim 16, wherein the information generation unit converts the time information and the image capturing information into a Flexible Image Transport System (FITS) format.

18. An imaging system comprising:
    the imaging apparatus according to claim 1; and
    a time information acquisition unit that acquires a reference time from a radio wave received from a GPS satellite,
    wherein the information generation unit generates the time information having a higher resolution than the reference time by using the reference time.

19. The imaging system according to claim 18, wherein the information generation unit comprises a counter that counts time of the time information and generates the time information having a higher resolution than the reference time by resetting the counter by using the reference time supplied from the outside of the imaging apparatus.

20. A control method of the imaging apparatus comprising a pixel unit having a plurality of pixels and a signal processing unit that generates image data by performing signal processing on a pixel signal read from the pixel unit and outputs the image data on a frame basis, the control method comprising steps of:
    generating time information on a frame basis;
    outputting the time information associated with one frame before output of the image data of the one frame from the signal processing unit is started; and
    starting output of the image data of the one frame after an end of the output of the time information ends.

* * * * *